(No Model.)
M. C. P. PARKER.
FISHING HOOK.
No. 582,677. Patented May 18, 1897.
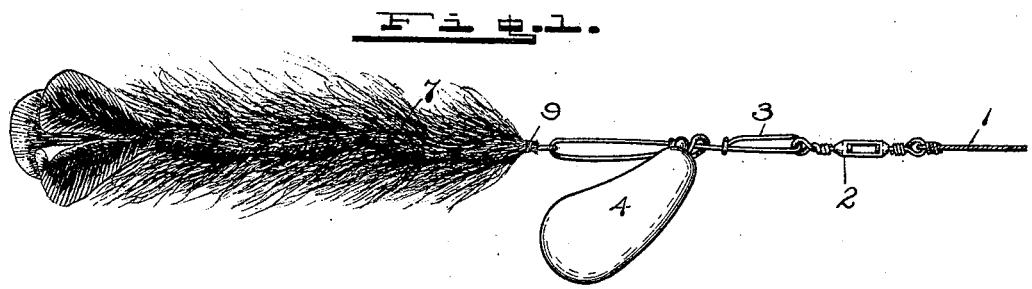
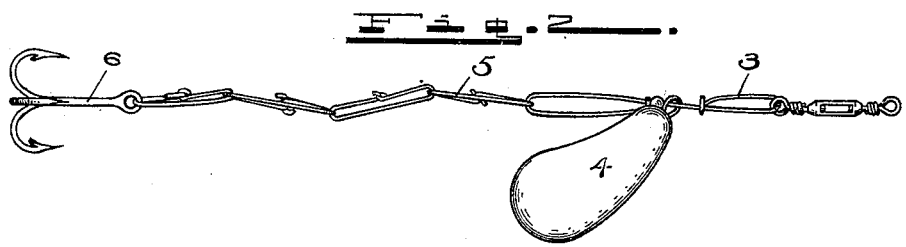
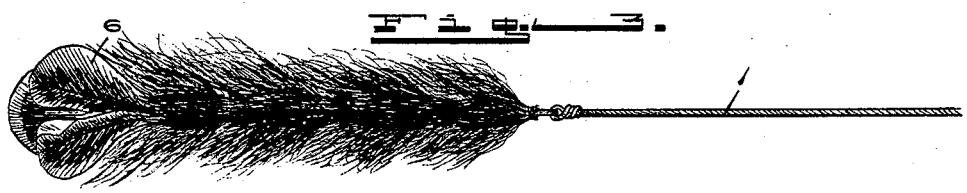
WITNESSES:
F. W. Woerner
C. M. Irlan
INVENTOR.
Mayne C. P. Parker
By H. Lockwood
His ATTORNEY.

UNITED STATES PATENT OFFICE.

MAYNE C. P. PARKER, OF INDIANAPOLIS, INDIANA.

FISHING-HOOK.

SPECIFICATION forming part of Letters Patent No. 582,677, dated May 18, 1897.

Application filed March 30, 1896. Serial No. 585,503. (No model.)

*To all whom it may concern:*

Be it known that I, MAYNE C. P. PARKER, of Indianapolis, county of Marion, and State of Indiana, have invented a certain new and useful Improvement in Fishing-Hooks; and I do hereby declare that the following is a full, clear, and exact description thereof, reference being had to the accompanying drawings, in which like figures refer to like parts.

The object of my invention is to make a hook which while in the water will have the appearance of a live worm. This I have attained by reason of two features, which will appear more fully hereinafter.

In fishing the hook is drawn through the water by intermittent pulls—that is, the fisherman draws it a short distance, then relaxes momentarily, then draws it again, and continues to repeat the operation. Therefore by securing to a suitable line or body hairs or feathers for a sufficient length to resemble a worm it is clear that the feathers or hairs, while the hook is being drawn through the water, will periodically contract and expand by reason of the intermittent pulls of the fisherman, thus giving the appearance of life to it. Furthermore, by making the body on which the feathers or hairs are secured of a series of links I am enabled to give, also by reason of the intermittent pulls, a clear and distinct sinuous movement of the artificial worm, because upon the relaxation of the fisherman after he gives his periodical pulls the links will tend to double up on each other, substantially as shown in the drawings, and when he makes the succeeding pulls they will tend to straighten. For these reasons I have an unusually attractive artificial bait that will attract the fish and at which they will grab and strike and be caught by the hooks on the end.

In the drawings, Figure 1 shows my fish-hook as it appears while being drawn through the water. Fig. 2 shows the metal links or skeleton of Fig. 1 with the hairs or feathers removed. Fig. 3 shows the hair or feathers secured to the end of the ordinary line adjacent to the hook.

To the line 1 I secure, preferably, a swivel 2, to which I secure a link or section 3, carrying the spoon 4. The portion I have just described is old.

I add to the foregoing, preferably, a series of links 5, made out of plain wire, by looping them and twisting their ends at substantially the middle point. On the end of said series of links I place the hooks 6. The series of links 5 are covered with hair or feathers, which hide the hooks at the end. The hair or feathers I secure to the upper end of each link by wrapping the same tightly with a silk thread 9. The overlapping or twisted ends of each link prevent such clump of feathers or hair from slipping downward, and the enlarged upper end of each link, as well as the link above, prevent it from slipping upward. The hair or feathers, it is observed, overlap the bunch below, but the bunches in no wise interfere with the free movement between the links, so that when the hook is thrown and drawn through the water by intermittent pulls the links will naturally assume the position shown in Fig. 2—that is, one link will extend slightly at an angle to the line of movement and the next link at an opposite angle to the former, and so on. By reason of this when the links are dressed up with hair or feathers, there being one bunch on each link and the joints of the links being free, the appearance will be substantially like that of a worm moving through the water—that is, the covered links will be sinuous and move through the water like a worm, and also the feathers or hair will contract and expand by reason of the intermittent pulls of the fisherman. The great value and merit of this improvement will be recognized by all experienced fishermen, as the "worm," especially when the hair or feathers are of varied colors, is very attractive to the fish. This is due, however, chiefly, it is believed, to the worm effect. I have usually used this in connection with spoons, but I have had equal success in fishing without the spoon and relying alone upon the worm.

In Fig. 3 I show a modified form where the worm is made without links. It is there shown straight; but when the worm is made upon anything flexible it will have a tendency to assume a sinuous form in its passage through the water for the reasons heretofore explained. Therefore a flexible body for the worm, it is believed, is necessary to get the worm effect, and that effect is greatly enhanced by using links so as to limit flexibility to a few points, that makes the worm more strikingly sinuous or worm-like, having an appearance of life.

What I claim as my invention, and desire to secure by Letters Patent, is—

The combination with a suitable line, of a series of links, each link provided with a stop between its ends, a bunch of hairs or feathers secured to each link between such stop and one end, and a hook fastened to the series of links.

In witness whereof I have hereunto set my hand this 3d day of March, 1896.

MAYNE C. P. PARKER.

Witnesses:
 V. H. LOCKWOOD,
 ZULA GREEN.